UNITED STATES PATENT OFFICE.

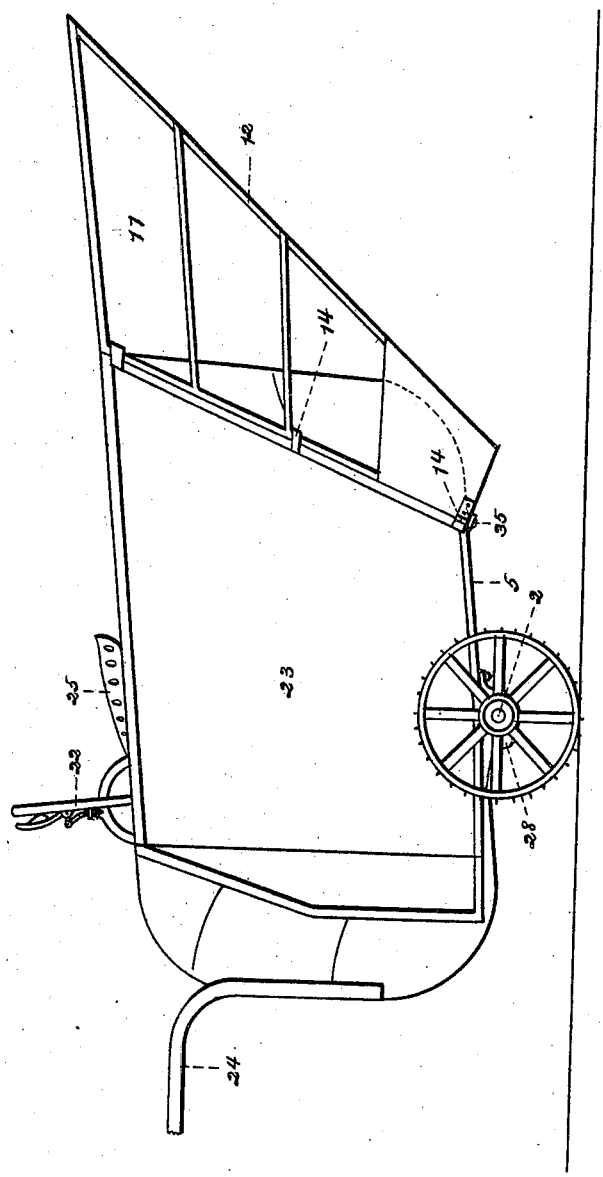

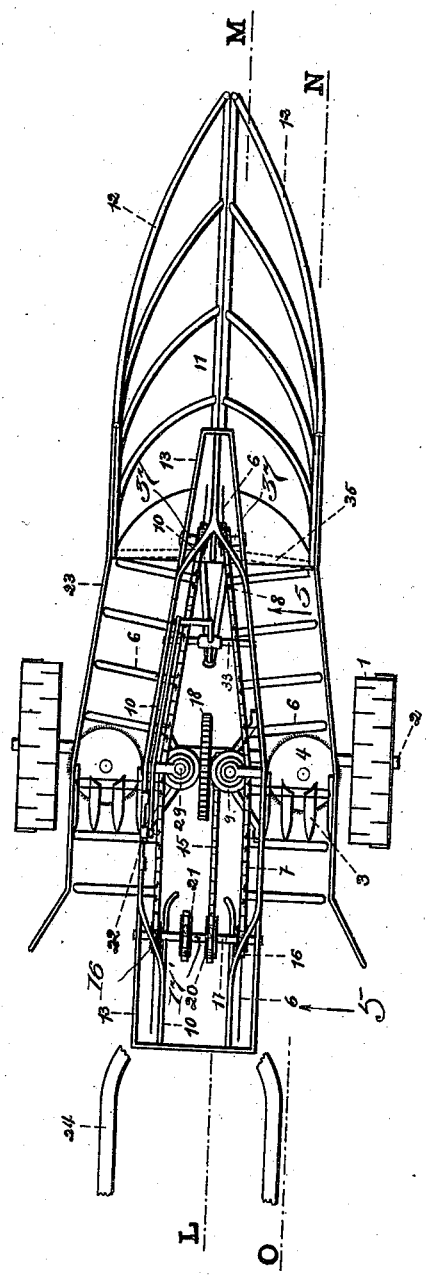

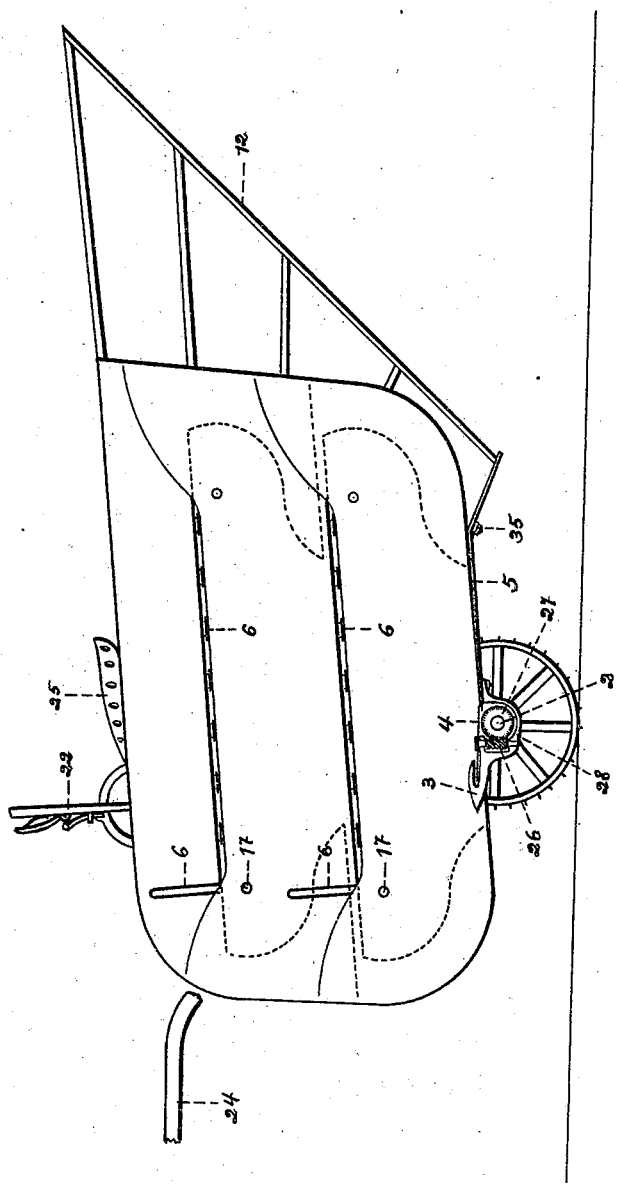

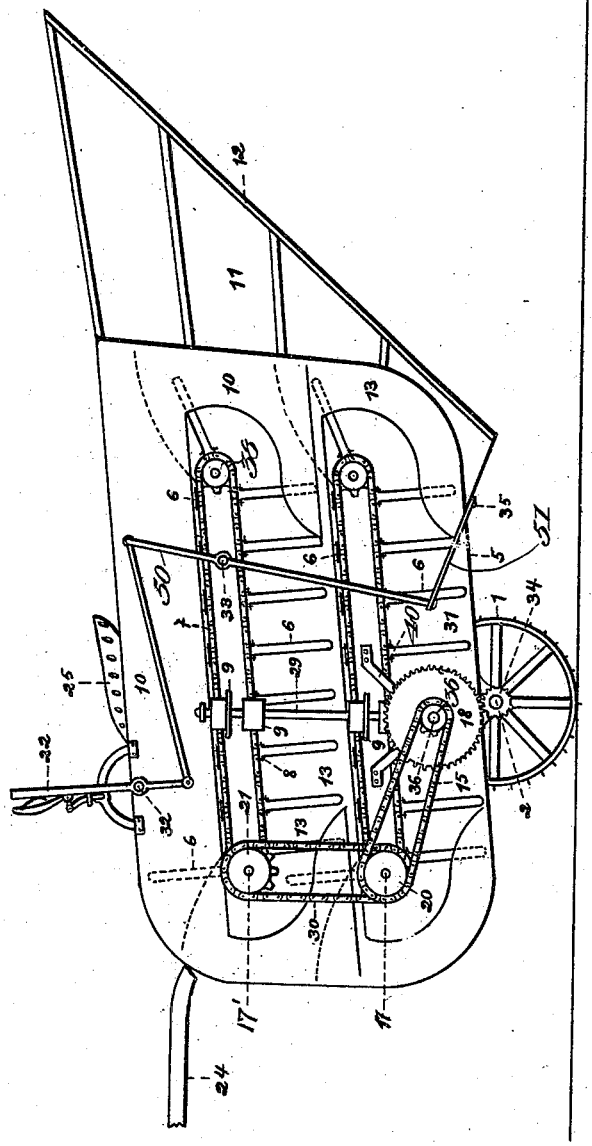

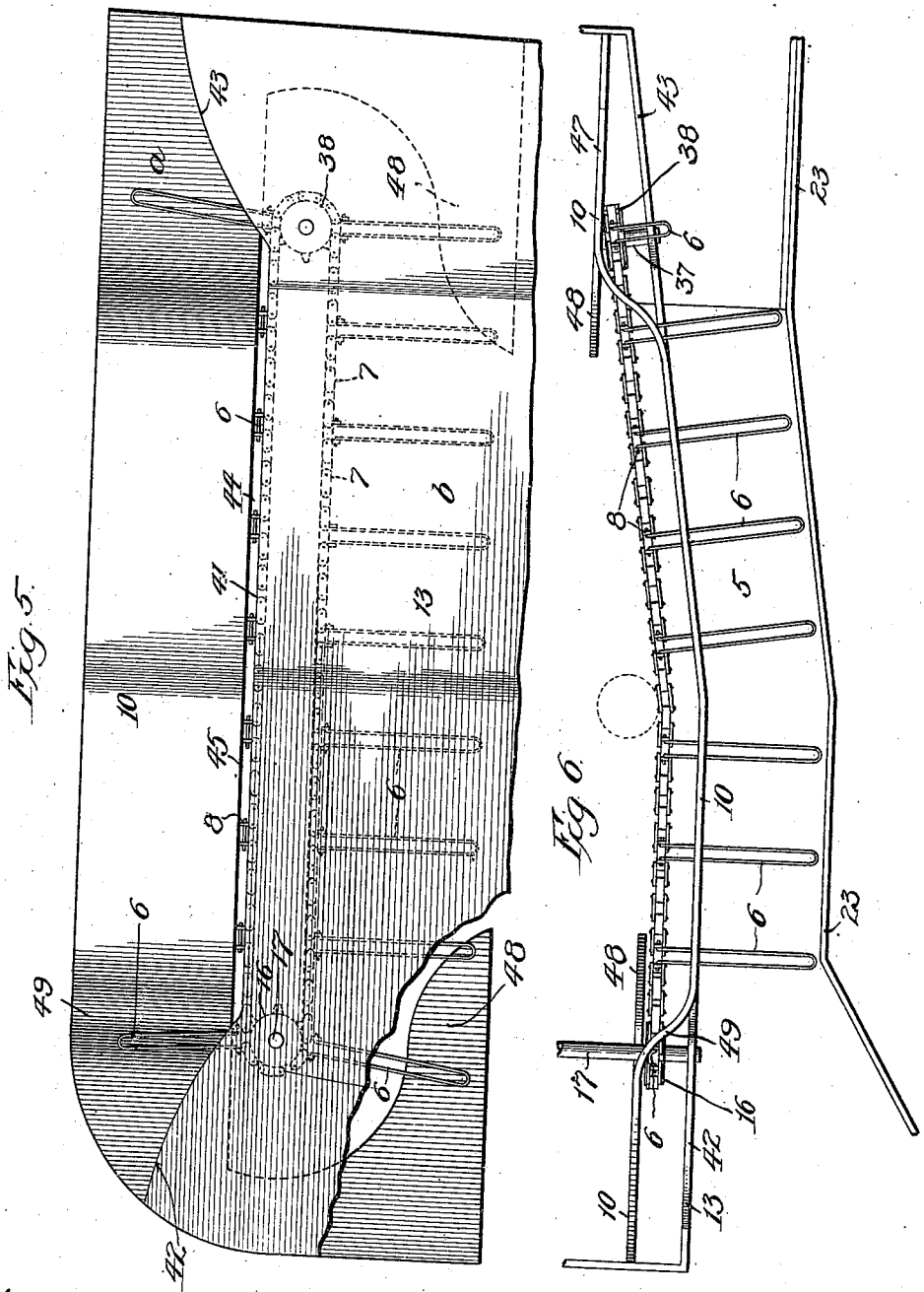

ADOLFO FORTUNATO PANDO, OF BUENOS AYRES, ARGENTINA.

HARVESTER.

977,832.  Specification of Letters Patent.  Patented Dec. 6, 1910.

Application filed May 22, 1908. Serial No. 434,323.

*To all whom it may concern:*

Be it known that I, ADOLFO FORTUNATO PANDO, citizen of Argentina, and resident of No. 329, Calle de Cangallo, in the city of Buenos Ayres, Argentina, engineer, have invented certain new and useful Improvements in Harvesters, of which the following is a specification.

This invention relates to improvements in harvesters especially adapted for use in harvesting corn, sugar cane, maize and any kind of crop having long and large stalks.

The invention is designed to cut the stalks close to the ground and convey the severed portions of the stalks to the bundler which may be operated at desired times to release a quantity of the stalks when the bundler has been filled and deposit the stalks upon the ground so that they can be shocked.

The invention will be more fully described in connection with the accompanying drawings and will be more particularly pointed out and ascertained in and by the appended claims.

In the drawings:—Figure 1 is a side elevation of a harvester embodying the main features of my invention. Fig. 2 is a plan view thereof. Fig. 3 is a longitudinal sectional view on line O—N of Fig. 2. Fig. 4 is a longitudinal sectional view on line L—M of Fig. 2. Fig. 5 is a fragmentary elevational view of one of the conveyers looking in the direction of the arrows 5 of Fig. 2 and illustrating the construction shown in Fig. 3 on an enlarged scale. Fig. 6 is a plan view of the parts shown in Fig. 5.

Like numerals of reference designate similar parts throughout the different figures of the drawings.

The improved harvester according to my invention is mounted upon an axle 2 supported by wheels 1, and 24 designates the attachment to which the horse may be hitched to draw the harvester. The shaft 36 is provided with a gear 18 which meshes with a gear 34 on the axle 2 and said shaft 36 also carries a sprocket wheel 36' for driving a sprocket chain 15. A shaft 17 is provided with a sprocket wheel 20 over which the sprocket chain 15 is trained and said shaft 17 is also provided with a sprocket wheel which drives a shaft 17' by means of a sprocket chain 30 and sprocket wheel 21, the latter being mounted on the shaft 17'. The shafts 17, and 17' carry at their opposite ends sprocket wheels 16 over which conveyer chains 7 are trained and which chains extend over idler sprocket wheels 38 mounted on shafts 37. Shafts 29, mounted in bearings 40 carry idlers 9 which maintain central portions of the conveyer chains in a prescribed line of movement, as will hereinafter more fully appear. It will be seen from the foregoing that pairs of conveyer chains are provided in superposed relation with the pairs laterally disposed with respect to each other and traveling in parallel relation.

Each chain is provided with a plurality of movably mounted or hinged fingers 6 arranged to be moved or shifted transversely with respect to the line of travel of the chain. Said fingers 6 are movably mounted at 8 upon said chain. Said fingers 6 may be formed of an integral length of wires bent in U-form to constitute the body of the finger and with its terminals bent at right angles to form hinged portions for connection with the chain.

In the arrangement shown the conveyer chains are actuated in a manner to cause their uppermost lengths to travel in a direction reverse to the direction of movement of the harvester while the lower lengths of the chains travel in the same direction as the harvester does. The purpose of the finger 6 is to engage the stalks and convey them rearwardly in the harvester and, obviously, reversely acting or oppositely traveling the fingers could not perform this function. Therefore according to my invention means are provided for throwing those fingers traveling reversely with respect to the line of movement of the harvester into operative relation and convey the stalks rearwardly and maintaining those fingers which travel in the same direction as the harvester out of operative relation with the stalk. In the construction shown said means also serve to maintain the fingers 6 in an operative position.

In the specific embodiment of the invention herein shown shields 13 are provided at each side of the machine and which extend throughout the line of travel of the chains and preferably slightly beyond the same at both ends. Said shields 13 are arranged in parallel relation at the front of the harvester and approximately half way of their length and at their rear ends said shields converge with respect to each other as clearly shown in Fig. 2. The disposition of the idlers 9 is such as to maintain the chains in substantially parallel relation with said shields 13. The upper marginal portions 41 of said shields 13 serve to support the fingers 6 in a horizontal position while the same are conveying the stalks rearwardly and the marginal portion 41 of said shields 13 terminates, adjacent the ends of the chains, in cam portions 42 and 43 respectively. Guide boards 23 are arranged in parallel relation with the shields 13 and form therewith a passageway for the stalk. When the fingers 6 reach the cam portions 43 they are thrown upwardly as indicated at $a$, Fig. 5, into a position at right angles to the horizontal. A guide board or guard 10 is disposed in vertical alinement with the shields 13 and is spaced apart therefrom to form an open passage 44 for the fingers 6. The fingers 6 therefore are conveyed in horizontal position longitudinally through the machine, their vertical movement being limited through the lower margin 45 of the guard 10 and the upper margin 41 of the shield 13. In the proximity of the cam portion 42 and 43 respectively the guard 10 recedes, as indicated at 46, and extends at 47 in parallel relation with the shields 13. It will be understood that the foregoing arrangement is provided for the fingers of each conveyer chain. The guard 10 extends downwardly and forwardly from the part 47 as indicated at 48 in a manner to guide the outer ends of the fingers until they have passed over the sprocket wheel 38 and into a vertical position as indicated at $b$. The fingers will normally remain in this position during its travel toward the forward end of the harvester and lie back of the shields 13 so as to be completely out of operative relation with respect to the stalk. The construction of the guard 10 at the forward end of conveyer chain is substantially the same as at the rearward end thereof and as the fingers approach the forward end they pass between the cam portions 42 and portion 47 lying in a plane transverse to the axis of the shaft 17′ until they reach the cam portions 49 of guard 10. The cam portion 49 shifts the fingers through an arc of 90° and into the horizontal position shown. When the fingers engage the cam portion 49 they ride between the same and the cam portions 42 which latter slope downwardly to the supporting margin 41 to gradually bring the fingers into an operative position with respect to the stalks.

In each of the lateral passage-ways formed by the shields 13 and guard 10 on the inside and the guide-boards 23 on the outside, there are provided horizontally disposed circular saws 4 which are operated by a worm 26 and worm wheel 27, the latter being mounted on the axle 2. Guides 3 may be provided to engage the stalks laterally in a manner to permit the saws to act upon the stalks. A platform 5 extends rearwardly from each saw 4 to support the stalks as they are being conveyed rearwardly in the harvester by the fingers 6. The superposed arrangement of fingers serves effectively to maintain the stalks in a substantially vertical position as the same are conveyed rearwardly upon the platform 5.

In harvesting crops such as corn, maize, sugar cane and the like, the stalks are usually shocked on the field and it is one of the objects of my invention to provide a bundler for collecting the stalks as the same are conveyed rearwardly in the harvester and carry the stalks until enough has been bundled to form a shock and thereafter dump the stalks upon the field. As shown the bundler comprises racks 11 hinged at 14 and curved inwardly and rearwardly in a manner to receive a bundle of stalks of approximately the number desired to form a shock. If desired the racks 11 may be inclined as indicated at 12 to provide an upper area of greater receiving capacity than the lower area to accommodate for the leaves.

Means are provided for opening the racks 11 to dump the bundles of stalks collected therein and as shown said means may consist of a lever 22 pivoted at 32 and connected by a link with a lever 50 pivoted at 33. The lever 50 may be connected with arms 51 which latter are connected with arms 35 whereby the racks 11 may be opened and closed. A seat 25 may be provided for the operator.

I claim:—

1. In a harvester for corn and the like the combination of guide boards, shields in opposition to said guide boards and forming passage ways for the stalks in coaction with said guide-boards, juxtaposed pairs of superposed conveying chains, two of said superposed chains being adjacent each of said passage ways, wheels rotating about horizontal axes supporting and driving said chains, a plurality of fingers movably mounted on each of said chains, guards in superposition with regard to said shields, said guards and shields being provided with cam portions adapted to shift said fingers into and out of said passage ways.

2. In a harvester for corn and the like the combination of guide boards, shields in opposition to said guide boards and forming independent passage ways for the stalks in coaction with said guide boards, juxtaposed pairs of superposed conveying chains, wheels rotating about horizontal axes supporting and driving said chains, a plurality of fingers mounted movably on each of said chains, guards in superposition with respect to said shields, said guards and shields being adapted to guide said fingers in horizontal position through said passage ways.

3. In a harvester for corn and such like the combination of guide boards disposed at the sides of the harvester, shields in opposition to each of said guide boards and forming independent passageways for the stalks in coaction with said guide boards, platforms at the bottom of said ways, said passage ways being parallel to each other at the front end of the harvester and leading into each other toward the rear thereof, conveying chains adjacent said passage ways, a plurality of fingers movably mounted on each of said chains and means for deflecting said chains from the parallel portion of said passage ways into the converging portion thereof.

In testimony whereof I affix my signature in presence of two witnesses.

ADOLFO FORTUNATO PANDO.

Witnesses:
    José Y. Gallardol,
    José Robles.